Nov. 19, 1968     E. M. KELLY     3,411,277

SALVAGING APPARATUS

Filed Nov. 29, 1965     2 Sheets-Sheet 1

EARL M. KELLY
INVENTOR

Huebner & Worrel
ATTORNEYS

Nov. 19, 1968  E. M. KELLY  3,411,277
SALVAGING APPARATUS
Filed Nov. 29, 1965  2 Sheets-Sheet 2
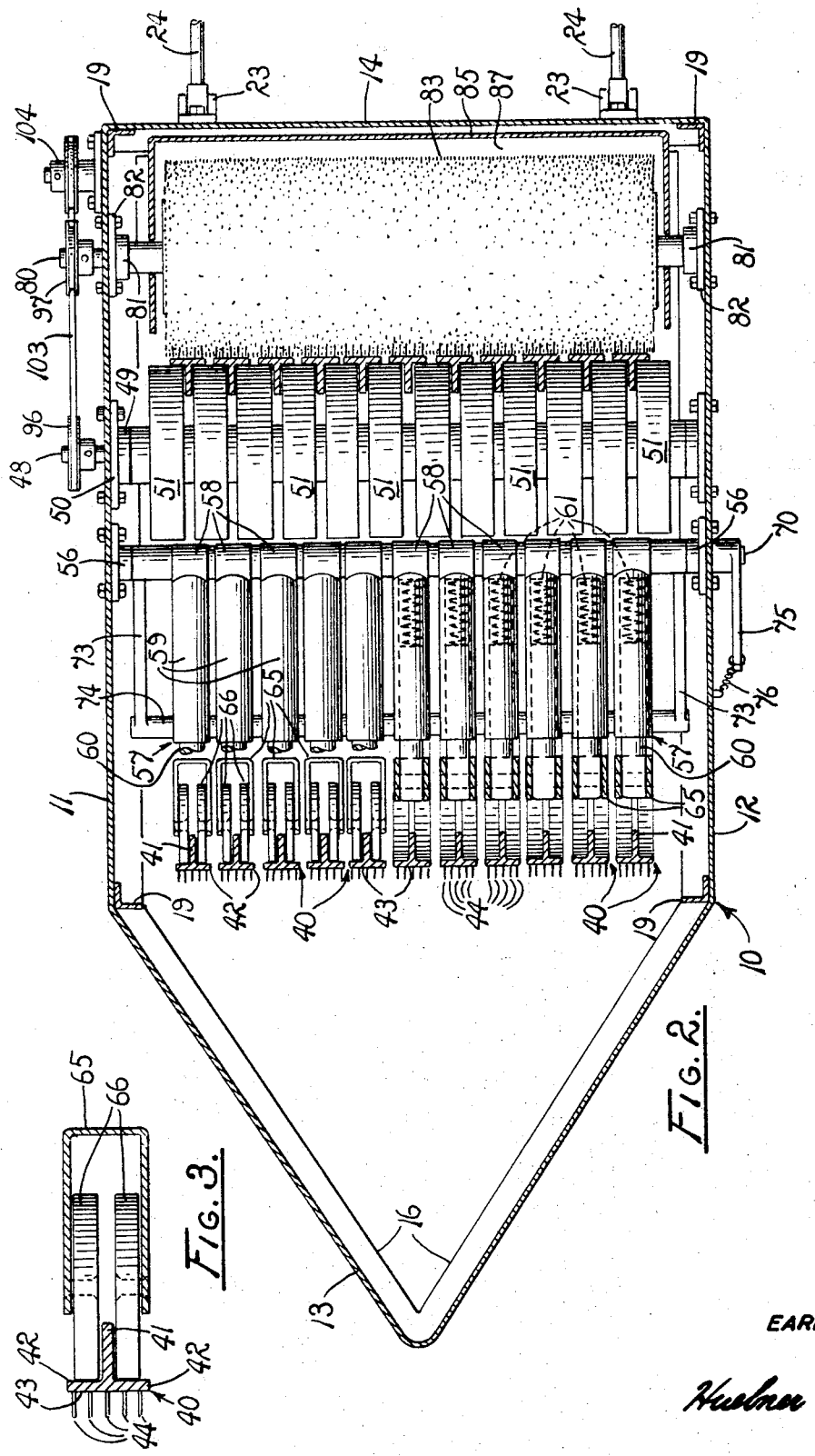
EARL M. KELLY
INVENTOR
Huebner & Worrel
ATTORNEYS United States Patent Office 3,411,277
Patented Nov. 19, 1968

3,411,277
SALVAGING APPARATUS
Earl M. Kelly, P.O. Box 788, Tulare, Calif. 93274
Filed Nov. 29, 1965, Ser. No. 510,267
10 Claims. (Cl. 56—28)

ABSTRACT OF THE DISCLOSURE

A salvaging apparatus providing an annular salvaging rim having inner and outer peripheries with picking means mounted on the outer rim and drive means engageable with the inner periphery of the rim including roller means and drive means opposite to the roller means, and means mounting the roller means for floating elevational movement permitting the rim to rise and fall in traversing uneven terrain while remaining in engagement with the drive means.

---

In the mechanical harvesting of cotton, a significant quantity of cotton is inadvertently dropped on the ground and lost. Such loss frequently amounts to one-half a bale or more per acre and can readily make the difference between a profitable and an unprofitable farm operation. In many instances, the cotton lost in the harvesting of a productive field actually exceeds the total production from an economically marginal field. Even in areas in which harvesting is still accomplished by hand, the loss has become significant as a result of declining proficiency of the available pickers.

The desirability of salvaging such cotton as well as that lost along roadways and in the yards of cotton gins has long been recognized and several devices have been provided for the purpose.

However, it is an object of the present invention to provide an improved apparatus for the purpose.

Another object is to provide a salvaging apparatus adapted to recover lint material generally.

Another object is to provide an improved cotton salvaging apparatus of the barbed wheel type.

Another object is to provide an improved cotton salvaging apparatus having a plurality of barbed wheels which individually rise and fall in traversing uneven terrain.

Another object is to provide improved elements and arrangements thereof in an apparatus of the character and for the purposes set forth.

These and other objects of the invention will become more fully apparent upon reference to the following description.

In the drawings:

FIG. 2 is a horizontal section of the apparatus taken at a position represented by line 2—2 of FIG. 1.

FIG. 3 is a somewhat enlarged fragmentary section taken on line 3—3 of FIG. 1.

Figure 1:
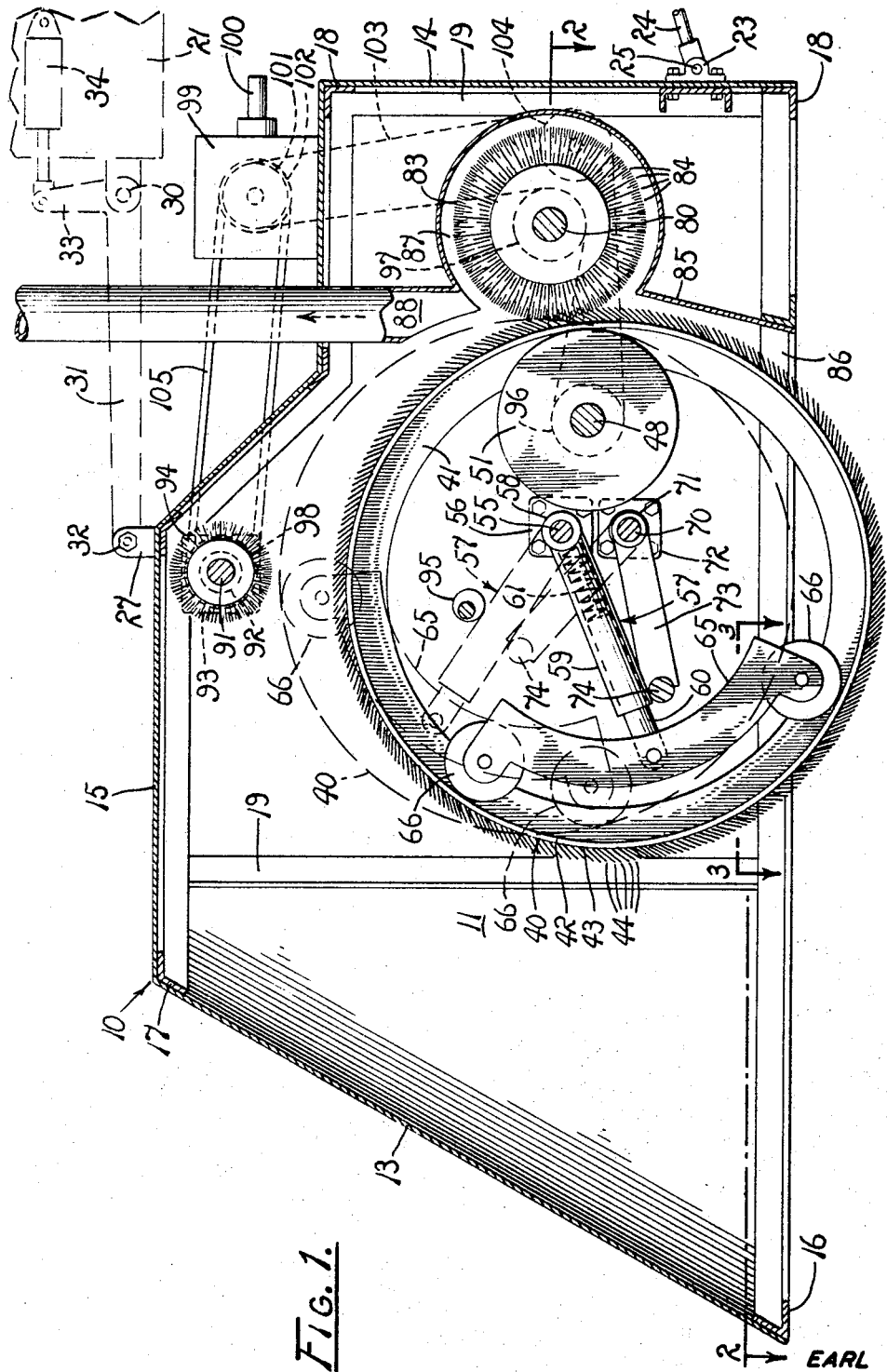
FIG. 1 is a central longitudinal vertical section of a salvaging apparatus embodying the principles of the present invention.

Referring in greater detail to the drawings:

The salvaging apparatus employs any suitable housing 10 which, in the illustrative embodiment, is shown as formed of sheet metal. A pair of substantially parallel, congruent side walls 11 and 12 are rigidly interconnected by a downwardly sloping front wall 13, rear wall 14 and top wall 15. The side walls preferably forwardly converge from their main parallel portions to form the front wall portions 13 which constitute plant deflectors. The walls are conveniently welded into a rigid assembly and reinforced by substantially horizontal transverse angle iron braces 16, 17 and 18, shown in FIG. 1, and substantially vertical angle iron braces 19, shown in FIG. 2.

The housing 10 may be mounted for field traversing movement by any suitable vehicle but conveniently is mounted in place of a picking head of conventional cotton picker, such as that shown in U.S. Patent No. 2,518,465. A portion of such a harvester is shown in dotted line in FIG. 1 at 21. A pair of brackets 23 are provided on the rear wall 14 of the housing and a pair of brace rods 24 of the cotton picker are individually pivotally connected to the brackets by pivot pins 25. A pair of brackets 27 are mounted on the top wall 15 of the housing. A rotatable shaft 30 is normally provided transversely on the front of the cotton picker and arms 31 radially extend from the shaft and are individually pivotally connected to the brackets 27 at 32. A sector arm 33 upwardly extends from the shaft 30 and together with arms 31 constitutes a bell-crank elevating means pivotal with the shaft 30 to raise and to lower the housing. A hydraulic ram 34 is mounted on the harvester and connects to the sector arm to provide the force required to rasie and to lower the housing. The weight of the housing and contained mechanism is counterbalanced by suitable spring means conventionally provided by such cotton pickers and not here shown.

A plurality of annular rims 40 having inner and outer peripheries are disposed in the housing 10 in substantially erect parallel planes aligned with the normal direction of movements of the picker 21. As best shown in FIGS. 2 and 3, the rims are T-shaped in radial section, each providing an inwardly extended guide flange 41 and opposite laterally or axially extended flanges 42. The flanges 42 are cylindrical and for each rim provide a common outwardly disposed surface 43. A plurality of barbs 44 are mounted on the surfaces 43 for cotton impaling purposes. As shown, the rims are in axial adjacent relation but can independently rise and fall.

A drive shaft 48 is extended axially through the rims 40 and provides opposite ends journaled in bearings 49 mounted by holders 50 secured in the side walls 11 and 12. A plurality of friction drive wheels 51 are rigidly mounted concentrically on the shaft 48, there being one more drive wheel than there are rims 40. As best shown in FIG. 2, the drive wheels are axially spaced to receive the inner flanges 41 of the rims therebetween in guided association and the drive wheels provide outer peripheries in frictional engagement with the flanges 42. It will be noted that each of the drive wheels which is disposed between adjacent rims overlaps and engages the adjacent flanges 42 of said adjacent rims.

To hold the rims 40 in continuous, frictional, tangential engagement with the drive wheels 51, a mounting shaft 55 is extended axially through the rims 40 and provides opposite ends mounted in the side walls 11 and 12 by any suitable means at 56. Telescopic arms 57, individual to the rims, are pivotally mounted on the shaft 55 for independent movement by means of collars 58 to which the arms are secured. each of the arms conveniently consists of a cylinder 59 which slidably receives a piston 60 with a compression spring 61 provided within the cylinder under compression between its collar 58 and piston.

The extended end of each telescopic arm 57 is centrally, pivotally connected to a longitudinally arcuate, transversely channel-form, rocker arm 65. Each of the rocker arms describes a radius approximating that of the rims. A peripherally grooved guide roller 66 is rotatably mounted at each end of each rocker arm and is fitted over the inner flange 41 of its arm's respective rim. It will be evident that the springs 61 urge the guide rollers outwardly against the rims and thus maintain the rims in engagement with the drive wheels 51 while accommodating individual elevational movement of the rims.

A control shaft 70 is journaled in bearings 71 mounted by holders 72 in the side walls 11 and 12. The control shaft is disposed below the mounting shaft 55 and at opposite ends provides radial arms 73 extended forwardly beneath the telescopic arms 57. A lift rod 74 interconnects the extended ends of the radial arms 73 beneath the telescopic arms. A control lever 75 is radially extended from the control shaft externally of the side wall 12. By lifting the lever 75, the control shaft 70 can be rotated to raise the lift rod 74 beneath the telescopic arms and concurrently to elevate said lift arms and their respective rims 40 to an upwardly retracted position, as for transport purposes. Any suitable securing means 76 is provided in association with the lever 75 releasably to retain the rims in elevated position.

A doffing shaft 80 is journaled in bearings 81 mounted in holders 82 secured to the side walls 11 and 12. It will be noted that the shafts 48, 55, 70 and 80 are parallel and that the doffing shaft is rearwardly adjacent to the point of tangential engagement of the rims 40 with the drive wheels 51. A doffer 83 of any suitable form is mounted on the shaft 80 and has outwardly extended bristles 84 engageable with the barbs 44 of the rims.

A shroud 85 is mounted between the side walls 11 and 12, defines an air intake passage 86 peripherally adjacent to the rims, extends about the doffer 83 to provide a chamber 87 therefor, and is connected to a suction duct 88 which communicates with an intake conduit, not shown, of the picker 21.

A cleaning shaft 91 is journaled in bearings 92 mounted in holders 93 on the side walls 11 and 12 above the rims 40. A cylindrical cleaning brush 94 is mounted on the shaft. To preclude elevation of the rims 40 too forcefully against the brush 94, a stop 95 is extended between the side walls 11 and 12 in a position engageable by the telescopic arms 57 when elevated. The stop preferably consists of a cylindrical shaft which is mounted to rotate between the side walls about an eccentric axis. The shaft is rotatably positioned to adjust the precise upper limit of the movement of the arms and thus the limit of movement of the rims against the brush.

To drive the shafts 48, 80 and 91, they are provided with V-belt pulleys 96, 97 and 98, respectively, externally of the wall 11. A gear box 99 is mounted on the top wall 15 of the housing 10 and has driven connection to a power take-off of the picker 21, not shown, by means of a coupling 100. The gear box provides a pair of external drive pulleys 101 and 102. Pulley 101 is disposed in a plane common to the pulleys 96 and 97 and the pulley 102 is disposed in a plane common to pulley 98. A V-belt 103 circumscribes the pulley 101 and the pulley 96. Intermediate these pulleys, the belt 103 is reversely extended about the pulley 97 so as to drive the doffer 83 in the opposite direction to the drive wheels 51. An idler pulley 104 is mounted on the side wall 11 adjacent to the pulley 97 and serves to hold the V-belt 103 outwardly from the pulley 97. A V-belt 105 circumscribes the drive pulley 102 and the pulley 98.

The operation of the described embodiment of the salvaging apparatus is believed to be clearly apparent and is briefly summarized at this point. To transport the apparatus, the ram 34 is actuated to elevate the housing 10 while the rims 40 are held in elevated position by raising the lever 75 to bring the lift rod 74 into supporting relation to the telescopic arms.

When an area is reached in which cotton or other fiber disposed on the ground is to be salvaged, the ram 34 is released to the extent desired to lower the housing 10 by downward pivotal movement of the arms 31 and rods 24. The lever 75 is released from the securing means 76, and the control shaft 70 is permitted to rotate to lower the lift rod 74 to retract it from the telescopic arms 57. The rims 40 are thus lowered and gravitationally rested on the ground or other support surface but for independent free floating movement in traversing uneven terrain. If it is desired to support the rims 40 adjacent to, but above, the surface of the ground, the securing means 76 can be utilized to hold the lift rod 74 in a position providing a somewhat elevated lower limit to downward pivotal movement of the telescopic arms. The power take-off, not shown, of the picker 21 is actuated to drive the drive wheels 51, doffer 83 and brush 94 through the drive linkages described. The drive wheels are preferably rotated at a speed such that the peripheries of the rims 40 have a linear velocity substantially equal to the earth traversing velocity of the picker or slightly in excess thereof.

It will be noted that the rims 40 are rotated in a counterclockwise direction, as viewed in FIG. 1. The barbs 44 are extended forwardly in the direction of rotation of the rims and serve to grasp cotton or other fiber into which they become engaged and to lift the same to the doffer 83. The doffer is rotated in a clockwise direction, as viewed, and at a peripheral velocity substantially greater than that of the rims. The doffer brushes the entrained cotton or the like from the barbs in the direction of the suction duct 88 through which it is drawn into the picker 21.

Occasionally, the barbs become entangled with debris and require cleaning. When this occurs, the lever 75 is raised to elevate the lift rod 74 beneath the telescopic arms 57 so as to raise the rings 40 correspondingly into engagement with the brush 94. Excessively forceful engagement is precluded by the stop 95. Unlike the doffer 83, the brush 94 rotates in the same direction as the rims so that the adjacent peripheries of the brush and the rims travel in opposite directions to achieve a vigorous cleaning action. When the cleaning is completed, the arms 57 are lowered and salvaging operations continued.

The overlapping of the adjacent flanges 42 of the rims 40 by the drive wheels 51 is conducive to dependable driven rotation of the rims and assures the proper disposition of the rims adjacent to the doffer 83 even while the rims independently rise and fall in traversing uneven terrain. The engagement of the inner flanges 41 between the drive wheels, assists in holding the rims in desired vertical attitude. The engagement of the flanges 41 in the grooves of the guide rollers 66 with the engagement between the drive wheels provides three-point guided engagement with each rim dependably holding it in position.

The described salvaging apparatus has proved effective in gathering cotton and the like disposed upon the ground and retrieving it for subsequent utilization. The cottom thus salvaged in a field of heavy production is sometimes as extensive as the total production of fields of more limited output. Although the salvaged cotton is frequently dirty, depending upon its position and exposure, the apparatus of the present invention in no way harms its staple length or quality during the gleaning operation.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A salvaging apparatus comprising a mobile frame having a predetermined relative direction of movement; an annular salvaging rim having inner and outer peripheries disposed in the frame in a substantially erect plane aligned with said direction of movement; picking means mounted on the outer periphery of said rim; a driving wheel mounted in the frame in driving engagement with the inner periphery of the rim; roller means engaged with the inner periphery of the rim opposite to the driving wheel; and means mounting the roller means in the frame for floating elevational movement whereby the rim can rise and fall in traversing uneven terrain while remaining in engagement with the driving wheel.

2. A salvaging apparatus for cotton and the like comprising a mobile frame having a predetermined relative direction of movement; a plurality of annular salvaging rims having inner and outer peripheries disposed in the frame in substantially erect parallel planes aligned with said direction of movement, said rims being in axially adjacent relation; picking means borne by the outer peripheries of the rims; driving means extended axially through the rims and rotatably mounted in the frame in frictional engagement with the rims; a pair of rollers individual to each rim; means interconnecting the rollers of each pair in fixed spaced relation for rotation about substantially parallel axes in planes common to their respective rims; pivot arms individual to each pair of rollers pivotally connected to the interconnecting means of their respective rollers and having ends inwardly extended from their respective rims; and means mounting the inner ends of the arms in the frame for independent elevational movement whereby the rims can rise and fall in traversing uneven terrain while remaining in frictional engagement with the driving means.

3. The apparatus of claim 2 in which the arms are longitudinally extensible and contractible and include means urging them into extension whereby their respective rollers are urged outwardly against their rims to draw the rims against the driving means.

4. The apparatus of claim 2 in which each arm comprises a cylinder, a piston slidable in the cylinder, and resilient means urging the piston outwardly of the cylinder.

5. The apparatus of claim 2 in which the inner ends of the arms are pivotally mounted on a common shaft extended axially of the rims and mounted in the frame.

6. The apparatus of claim 5 including a control shaft rotatably mounted in the frame in substantially parallel relation to said common shaft, means for controlling the rotation position of the control shaft, and control arms individual to the pivotal arms rigidly radially extended from the control shaft and having controlling engagement with their respective pivotal arms.

7. The apparatus of claim 2 in which the rims are transversely of substantially T-shape, each having an inwardly extended flange and oppositely axially extended substantially cylinderical flanges with the cylindrical flanges of adjacent rims being in juxtaposition adjacent to the driving means; and in which the driving means comprises axially aligned friction wheels engaged outwardly against the cylindrical flanges of the rims.

8. The apparatus of claim 7 in which the friction wheels between adjacent rims overlap the cylindrical flanges thereof to provide a common drive for said adjacent rims and the rollers are peripherally grooved and receive the inwardly extended flanges of their respective rims therein.

9. The apparatus of claim 8 in which the friction wheels are mounted on a common drive shaft extended axially of the rims and journaled in the frame.

10. The apparatus of claim 9 including doffing means mounted in the frame outwardly of the rims adjacent to the friction wheels engageable with the picking means to remove cotton and the like therefrom.

References Cited

UNITED STATES PATENTS

| | | | |
|---|---|---|---|
| 1,214,490 | 1/1917 | Ford | 56—28 |
| 1,317,927 | 10/1919 | Lint | 56—328 |
| 2,670,584 | 3/1954 | Rood, et al. | 56—28 |
| 2,928,224 | 3/1960 | Powell | 56—28 |
| 3,117,405 | 1/1964 | Clare | 56—11 |
| 3,143,841 | 8/1964 | Kirtland | 56—28 |
| 3,164,940 | 1/1965 | Gray | 56—28 |

RUSSELL R. KINSEY, *Primary Examiner.*